United States Patent [19]

Stanley

[11] Patent Number: 5,096,301
[45] Date of Patent: Mar. 17, 1992

[54] FIBER ALIGNMENT DEVICE; METHOD OF MAKING AND USING

[75] Inventor: Ian W. Stanley, Tuddenham St Martin, England

[73] Assignee: British Telecommunications public limited company, Great Britain

[21] Appl. No.: 687,928
[22] PCT Filed: Nov. 29, 1989
[86] PCT No.: PCT/GB89/01430
§ 371 Date: Jun. 6, 1991
§ 102(e) Date: Jun. 6, 1991
[87] PCT Pub. No.: WO90/06529
PCT Pub. Date: Jun. 14, 1990

[30] Foreign Application Priority Data

Nov. 29, 1988 [GB] United Kingdom ............... 8827872

[51] Int. Cl.⁵ ..................................... G01N 21/00
[52] U.S. Cl. .................. 356/73.1; 385/123; 385/76; 385/139; 65/3.11; 65/3.12; 65/60.5; 356/399; 356/400; 356/445
[58] Field of Search ........... 65/3.11, 3.12, 60.1, 65/60.5, 111; 385/123, 139, 76; 356/400, 399, 73.1, 445

[56] References Cited

U.S. PATENT DOCUMENTS

| | | | |
|---|---|---|---|
| 4,143,940 | 3/1979 | Khoe | 350/96.15 |
| 4,147,402 | 4/1979 | Chown | 264/1.5 |
| 4,197,007 | 4/1980 | Costa et al. | 356/73.1 |
| 4,334,774 | 6/1982 | Glass et al. | 356/152 |
| 4,367,952 | 1/1983 | Ahrens et al. | 356/400 |
| 4,385,832 | 5/1983 | Doi et al. | 356/73.1 |
| 4,468,118 | 8/1984 | Bice | 356/73.1 |
| 4,662,743 | 5/1987 | Nishimura et al. | 356/73.1 |
| 5,015,067 | 5/1991 | Levatter | 385/123 |

FOREIGN PATENT DOCUMENTS

| | | |
|---|---|---|
| 2535857 | 5/1984 | France . |
| 55-73011 | 6/1980 | Japan . |
| 56-167115 | 12/1981 | Japan . |
| 59-7312 | 4/1984 | Japan . |
| 8808651 | 11/1988 | PCT Int'l Appl. . |

OTHER PUBLICATIONS

Electronic Letters, Jul. 10, '75, vol. 11, No. 14, Direct Coupling from a laser into a fibre, R. B. Dyott, pp. 308–309.

Primary Examiner—Richard V. Fisher
Assistant Examiner—John J. Bruckner
Attorney, Agent, or Firm—Nixon & Vanderhye

[57] ABSTRACT

An optical fiber (1) has an endface (2) which has been coated with a metal oxide coating (5) such that the light guiding core region (4) of the endface (2) is at least partially bounded by the coating (5) while being uncoated itself. The core region (4) has a different reflectivity than that of the boundary region (3). The fiber may be used in a system for aligning a fiber with an optical device (20).

9 Claims, 1 Drawing Sheet

FIBER ALIGNMENT DEVICE; METHOD OF MAKING AND USING

This invention relates to an optical device having an optical waveguide.

It is often necessary to align a passive or active optical device with an optical waveguide, in order to obtain maximum efficiency in coupling optical signals between the waveguide and the device. When the waveguide is an optical fibre the light guiding region of the fibre, that is, the inner core region, must be aligned with the light emitting or light receiving region of the device.

In a known method of aligning an optical fibre with a laser, an optical signal from the laser is arranged to be incident on the fibre. The intensity of the signal emerging from the fibre is measured, and the position of the fibre relative to the laser is altered in order to obtain maximum intensity of the signal emerging from the fibre. The alignment is thus set initially by measurement. A disadvantage of this known method is that the alignment is set only initially and assumed to remain satisfactory thereafter. However, subsequent movement, vibration or temperature stresses may result in movement of the laser relative to the fibre. Any such movement therefore remains undetected, and maximum efficiency in coupling may no longer be achieved.

In a known method of detecting pits which form tracks in a compact disc, the pits are detected by a servo mechanism which detects the pits and adjusts a laser relative to the pits in order that the laser is locked onto the tracks. The servo mechanism acts to dynamically adjust the relative positions of the laser and the pits in order to maintain maximum efficiency. The mechanism detects the pits in the compact disc, by detecting a difference in reflectivity between the pits and the remaining surface of the disc. Such servo laser devices are mass produced and therefore relatively cheap optical sources. However, they cannot be used to align the laser with known optical waveguides. It is an object of the present invention to solve this problem.

According to a first aspect of the present invention there is provided an optical apparatus comprising an optical waveguide having an endface; a light guiding region exposed at the endface and bounded at the endface by at least two opposing boundary regions, the reflectivity of the light guiding region being different to that of the boundary regions, characterised in that the apparatus further includes and optical source; alignment means responsive to the difference in reflectivity between the light guiding region and the boundary regions for aligning the optical source with the light guiding region.

An optical device can be arranged to scan the endface of the waveguide and thus detect and locate the position of the light guiding region. This thus enables the mass produced servoed laser devices to be used as optical sources for waveguide systems although, it is to be understood that some modification of the devices used in relation to compact discs may be necessary. For instance, the coupling arrangement between the laser and the waveguide may require modification.

According to a second aspect of the present invention there is provided a method of fabricating an optical waveguide having an endface; a light guiding region exposed at the endface and bounded at the endface by at least two opposing boundary regions exposed at the end-face, the reflectivity of the light guiding region at the end-face being different to that of the boundary regions, the method comprising coating at least a portion of the endface of the waveguide with a material which is of the type which breaks down when heated; passing an optical signal through the light guiding region thereby producing heat sufficient to cause the material to break down in the light guiding region of the endface but not in the boundary regions.

Conveniently, the waveguide is an optical fibre and the light guiding region is an inner core region, and the boundary region is an outer cladding region.

Alternatively, a planar waveguide such as lithium niobate with a titanium in-diffused channel may be used.

Preferably, the optical fibre comprises a coating of material covering substantially all of the cladding region and is fabricated by coating substantially all of the endface of the waveguide with the material which is of the type which breaks down when heated; passing an optical signal through the light guiding region thereby producing heat sufficient to cause the material to break down in the light guiding region.

Removal of the material in this way results in the automatic alignment of the surface reflecting boundary to the edge of the light guiding core region of the fibre at or near its boundary with the cladding.

The invention will now be described by way of example only, with reference to the accompanying drawings in which.

Figure 1:
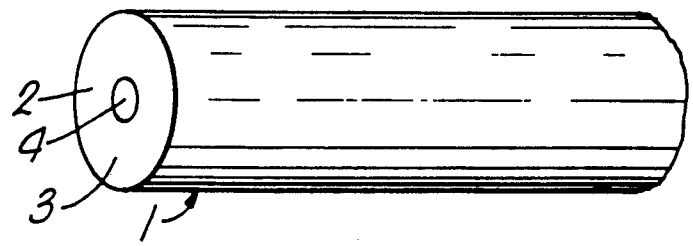
FIG. 1 is a perspective view of a known optical fibre.

Referring to FIG. 1, a known optical fibre 1 comprises an endface 2 having an outer boundary region 3, and an inner light guiding core region 4. Light travelling along the fibre is guided through the fibre within the light guiding region.

Figure 2:
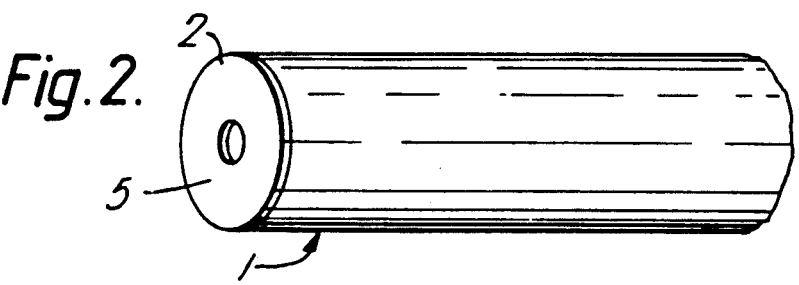
FIG. 2 is a perspective view of an optical fibre suitable for use with the present invention.
Figure 3:
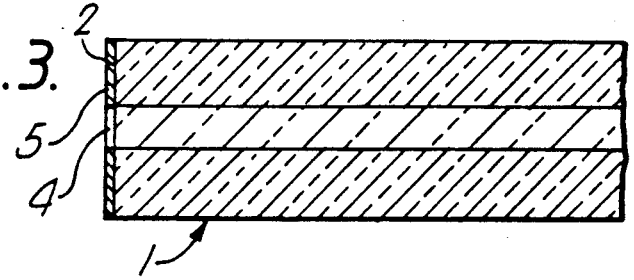
FIG. 3 is a longitudinal cross section of the fibre of FIG. 2.

Referring to FIGS. 2 and 3, an optical fibre suitable for use with the invention is shown. The parts of the fibre which correspond to parts of the fibre of FIG. 1 are given equivalent reference numerals. The endface 2 of the fibre 1 has been coated with a coating 5 such that substantially all of the outer cladding region 3 is covered by the coating 5, and the inner core region 4 is substantially completely uncovered by the coating 5.

One method of forming the endface is to form a coating, for example, a metal oxide, and apply it to the endface 2 by evaporating or sputtering the metal oxide onto the endface. This results in substantially all of the endface being coated with the coating. An intense optical beam is then passed along the fibre 1. The intense optical beam is constrained by the fibre design to travel in the same spatial volume of the fibre in or near the core that a normal lower power signal would occupy. This causes the coating 5 over the core region 4 of the fibre to be removed by evaporation in the particular area which it is required to align with adjacent devices. The coating 5 remains covering substantially all of the cladding region, and has a reflectivity which is different from that of the core region 4. A metal oxide is chosen to form the coating as it will have an amorphous structure and will absorb the energy of the intense optical beam sufficiently to burn off. Other types of materials such as certain metals may also be used. The endface 2 of the fibre, when viewed axially, now comprises the core region 4 from which the coating 5 has been removed, surrounded by an annulus of coating 5. Because of the difference in reflectivity of the coating 5 and the core 4, an optical detecting device can be used to locate the core 4 by the difference in reflection from the core 4 and the annular coating 5 and so align the laser with the core.

Another method of forming the endface is to use selective deposition by masking.

Figure 4:
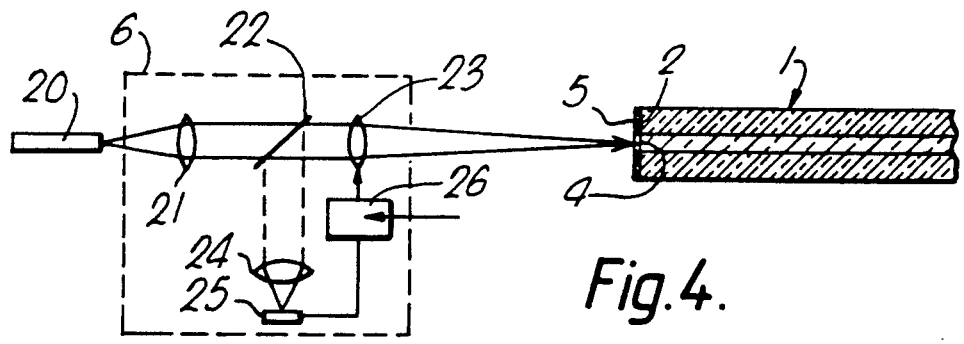
FIG. 4 is a schematic representation of a servo mechanism and fibre forming an alignment system in accordance with the invention.

Referring to FIG. 4, an alignment system in accordance with the invention is shown schematically. The system comprises an optical fibre 1 of the type shown in FIGS. 2 and 3 and an optical tracking source 6. The optical tracking source 6 is coupled to a laser 20 for producing an optical signal. The optical signal is focussed by lens 21 onto a beam splitter 22, such as a half reflecting mirror. The beam splitter 22 divides the optical signal into two beams such that a first portion is incident upon a second, moveable lens 23 which focusses the first portion onto the fibre endface. The beam splitter 22 directs a second portion of the optical signal onto a third lens 24 which focusses the second portion onto a matrix detector 25. A feed back and control system 26 links moveable lens 23 and matrix 25 to align the first portion of the optical beam with the waveguiding region of the fibre 1.

Figure 5:
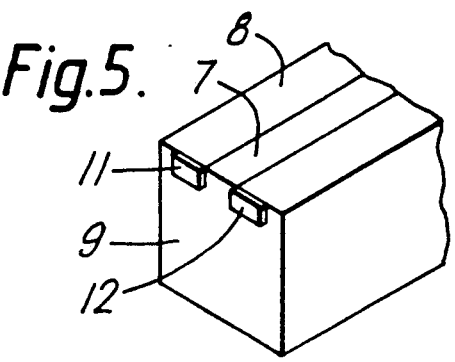
FIG. 5 is a perspective view of planar optical waveguide made suitable for use with the present invention.

Referring to FIG. 5, a planar waveguide made in accordance with the invention is shown. The waveguide 7 comprises a lithium niobate block 8 having a titanium in-diffused channel 7 which is a light guiding region. The endface 9 of the waveguide 7 has been coated with a coating such that two opposite boundary regions 11, 12 of the lithium niobate block 8 are covered by the coating, and the light guiding region 7 is left uncovered.

In this context, the term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibre.

I claim:
1. An optical apparatus comprising:
   an optical waveguide having a longitudinal axis and an endface transverse to said axis;
   a light guiding region exposed at the endface and at least partially bounded at the endface by at least one boundary region coated onto said endface, the reflectivity of the light guiding region being different from that of the boundary region,
   characterised in that the apparatus further comprises an optical source, and alignment means, responsive to the difference in reflectivity between the light guiding region and the boundary region, for aligning the optical source with the light guiding region.

2. Apparatus according to claim 1 wherein the optical source is a laser.

3. Apparatus according to claim 1 in which the light guiding region of the optical waveguide is an inner core region of an optical fibre and the boundary region covers at least part of an outer cladding of said optical fibre.

4. Apparatus according to claim 1 in which the boundary region of the optical waveguide comprises an annular coating.

5. Apparatus according to claim 4 wherein the coating is a metal oxide.

6. A method of fabricating an optical waveguide having a longitudinal axis along a light guiding region, bounded at least partially by a boundary region coated onto an endface of said waveguide, said endface being transverse to said axis, the reflectivity of the light guiding region being different from that of the boundary region, the method comprising the steps of:
   coating at least a portion of said endface of said optical waveguide with a material which is of a type which breaks down when heated; and
   forming said boundary region by passing an optical signal through the light guiding region of said waveguide thereby producing heat sufficient to cause the material to break down where it coats the light guiding region of the endface but not where it forms said boundary region.

7. A method according to claim 6 wherein said endface is coated by evaporating onto the endface.

8. A method according to claim 6 wherein the heat produced by the optical signal causes the material to evaporate.

9. A method of aligning an optical source to a light guiding region of an optical waveguide having a longitudinal axis and an endface transverse to said axis said light guiding region being at least partially bounded by at least one boundary region coated onto said endface, the reflectivity of the light guiding region being different from that of the boundary region, the method comprising the steps of:
   measuring the difference in reflectivity across the endface, thereby detecting the location of the light guiding region; and
   moving the optical source relative to the waveguide in response to the reflectivity measurement, thereby aligning the optical source with the light guiding region.

* * * * *